United States Patent
Roh et al.

(10) Patent No.: US 8,436,722 B2
(45) Date of Patent: May 7, 2013

(54) METHOD AND APPARATUS FOR GATHERING VEHICLE ACCIDENT INFORMATION

(75) Inventors: Seung Hyun Roh, Gyeonggi-do (KR); Min Woo Park, Gyeonggi-do (KR); Doo Kyum Kim, Gyeonggi-do (KR)

(73) Assignee: Mando Corporation, Pyeongtaek-si (KR)

( * ) Notice: Subject to any disclaimer, the term of this patent is extended or adjusted under 35 U.S.C. 154(b) by 956 days.

(21) Appl. No.: 12/509,221

(22) Filed: Jul. 24, 2009

(65) Prior Publication Data

US 2010/0019892 A1  Jan. 28, 2010

(30) Foreign Application Priority Data

Jul. 24, 2008 (KR) .................. 10-2008-0072025

(51) Int. Cl.
*B60Q 1/00* (2006.01)

(52) U.S. Cl.
USPC ........... 340/436; 340/901; 340/902; 340/903; 340/904; 340/905; 340/539.1; 701/34.3; 701/34.4; 701/36; 701/43

(58) Field of Classification Search .......... 340/901–905, 340/438, 539.1; 701/34.3, 34.4, 36, 43
See application file for complete search history.

(56) References Cited

U.S. PATENT DOCUMENTS

2003/0225492 A1 12/2003 Cope et al.
2010/0019892 A1* 1/2010 Roh et al. ..................... 340/436

OTHER PUBLICATIONS

U.S. Appl. No. 12/490,155, Min Woo Park et al., "Gateway Control Apparatus for Vehicles and Travel Information Recording Method Thereof," filed Jun. 23, 2009.

* cited by examiner

*Primary Examiner* — Daryl Pope
(74) *Attorney, Agent, or Firm* — McDermott Will & Emery LLP

(57) ABSTRACT

A gateway control apparatus for vehicles includes a receiver configured to receive vehicle state information from vehicle ECUs and a vehicle-to-vehicle distance from an intelligent cruise control unit. The gateway control apparatus also includes a first memory to store the vehicle state information, a calculation unit to calculate a relative velocity and a relative acceleration from the vehicle state information, and to calculate a collision index. A determination unit determines if the collision index exceeds a predetermined value. A vehicle information management unit determines an accident occurrence time point when the collision index exceeds the predetermined value, and allows the first memory to store pre-accident and post-accident vehicle state information. The gateway control apparatus stores the pre-accident and post-accident vehicle state information even in the case of a fender bender or minor collision to use the stored information for post-accident judgment.

16 Claims, 3 Drawing Sheets

METHOD AND APPARATUS FOR GATHERING VEHICLE ACCIDENT INFORMATION

BACKGROUND

1. Technical Field

The present disclosure relates to a gateway control apparatus for vehicles and a travel information recording method thereof. More particularly, the gateway control apparatus can store pre-accident and post-accident vehicle state information even in the case of a fender bender or minor collision, so that the information can be used for post-accident judgment of fault and responsibility for the accident and for prevention of future vehicle accidents.

2. Description of the Related Art

Modern automobiles (also referred to as vehicles herein) often include numerous embedded systems, i.e., electronic control units (ECUs) that control various subsystems in a vehicle. Generally, the gateway control apparatus enables data communication between the ECUs having different communication modes, such as a controller area network (CAN), a local interconnect network (LIN), a media oriented systems transport (MOST), and FlexRay. More particularly, the gateway control apparatus links different control units for various subsystems in a vehicle and has a simple function of recording communication data. As such, the gateway control apparatus can record the communication data, but does not actively analyze or provide vehicle state information. Accordingly, when a vehicle is in an accident such as a fender bender or minor collision while traveling on a road, it is difficult to achieve sufficient analysis of factors contributing to the cause of the accident.

Currently, the gateway control apparatus determines an occurrence of an accident based on if an airbag deploys or if an acceleration sensor detects any sudden deceleration. The gateway control apparatus records vehicle state information if the accident is determined to have occurred. However, in circumstances where the airbag did not deploy or when the deceleration is not clearly an accident, such as in a fender bender or minor collision, the gateway control apparatus does not record the information, and, in the worst case, it omits information relevant to the seriousness of the accident. Often, the gateway control apparatus provides no assistance in prevention of future vehicle accidents. Moreover, since the gateway control apparatus cannot analyze or examine factors that cause the vehicle accident, it is difficult for the vehicle to suitably avoid or prevent future accidents.

BRIEF SUMMARY

The present disclosure is directed to a gateway control apparatus for vehicles and a travel information recording method thereof, which can store pre-accident and post-accident vehicle state information even in the case of a fender bender or a minor collision accident. The stored information can be used for post-accident judgment of fault or responsibility for the accident and for analysis of factors causing the accident for prevention of future accidents.

In accordance with one aspect, a gateway control apparatus for vehicles includes: a receiver receiving vehicle state information sent from ECUs of a vehicle and a vehicle-to-vehicle distance from an intelligent cruise control unit, the vehicle state information including a vehicle velocity or acceleration; a first memory storing the received vehicle state information; a calculation unit calculating a relative velocity and a relative acceleration based on the received vehicle state information and calculating a collision index using the relative velocity, the relative acceleration, and the vehicle-to-vehicle distance; a determination unit determining whether the collision index exceeds a predetermined value; and a vehicle information management unit determining an accident occurrence time point when the collision index exceeds the predetermined value and allowing the first memory to store pre-accident vehicle state information and post-accident vehicle state information obtained with reference to the accident occurrence time point. The collision index may be a value obtained by adding a first value and a second value, in which the first value is obtained by dividing the relative velocity by the vehicle-to-vehicle distance and the second value is obtained by dividing the relative acceleration by the vehicle-to-vehicle distance.

The vehicle information management unit may allow a second memory to store the pre-accident vehicle state information and the post-accident vehicle state information read out from the first memory. The second memory may be a non-volatile memory. The vehicle information management unit may receive and allow the post-accident vehicle state information to be stored in the first memory in addition to the pre-accident vehicle state information which has already been stored in the first memory.

In accordance with another aspect, a travel information recording method of a gateway control apparatus for vehicles includes: receiving and storing, in a first memory, vehicle state information sent from ECUs of a vehicle; receiving a vehicle-to-vehicle distance measured by an intelligent cruise control unit; calculating a relative velocity and a relative acceleration based on the received vehicle state information; calculating a collision index using the relative velocity, the relative acceleration, and the vehicle-to-vehicle distance; determining whether the collision index exceeds a predetermined value; and determining an accident occurrence time point when the collision index exceeds the predetermined value, and storing, in the first memory, pre-accident vehicle state information and post-accident vehicle state information obtained with reference to the accident occurrence time point, when the collision index exceeds the predetermined value.

The method may further include, after storing the pre-accident vehicle state information and the post-accident vehicle state information in the first memory, reading out the pre-accident vehicle state information and the post-accident vehicle state information from the first memory, and storing the pre-accident vehicle state information and the post-accident vehicle state information in the second memory.

The storing pre-accident vehicle state information and post-accident vehicle state information in the first memory may include performing a time count when the collision index exceeds a predetermined value; determining whether counted time exceeds a preset time; receiving the post-accident vehicle state information, if the counted time does not reach the preset time; and receiving vehicle state information of the vehicle traveling on a road and adding the vehicle state information as the post-accident vehicle state information to the pre-accident vehicle state information stored in the first memory, if the counted time reaches the preset time.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures associated with automobiles and electronic control units have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
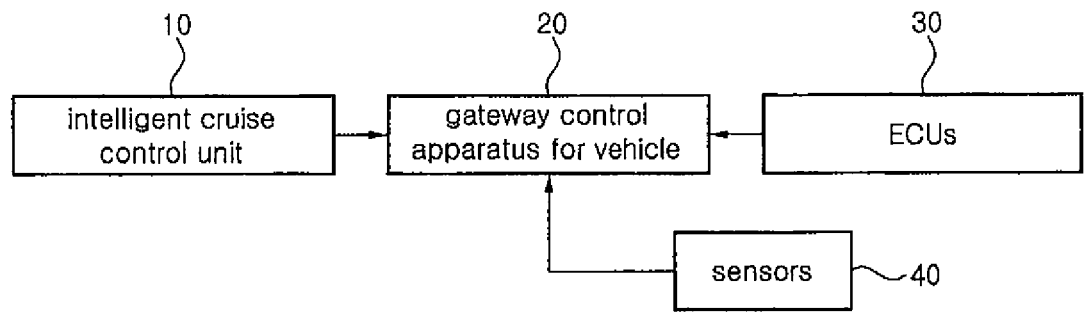
FIG. 1 is a block diagram of a gateway control apparatus for vehicles according to one embodiment of the present disclosure.

Hereinafter, exemplary embodiments of the present disclosure will be described in detail with reference to the accompanying drawings. Referring to FIG. 1, which is a block diagram of a gateway control apparatus for vehicles according to one embodiment of the disclosure, the gateway control apparatus 20 receives vehicle state information, such as vehicle velocity, acceleration, and the like, from electronic control units (ECUs) 30 having different communication modes. Further, the gateway control apparatus 20 receives a vehicle-to-vehicle distance with respect to another vehicle from an intelligent cruise control unit 10 in a vehicle. The gateway control apparatus 20 may also receive the vehicle state information from various sensors 40 in the vehicle.

Modern automobiles, also referred to as vehicles herein, include numerous ECUs that control subsystems such as a brake control unit, a suspension control unit, an electronic stability control unit, a tire pressure control unit, and a steering control unit. This is not an exhaustive list, since there are typically more than 50 different ECUs in a vehicle. The ECUs 30 may have different communication modes that require different interfaces to receive the information. As will be described in more detail below, the gateway control apparatus includes a plurality of interfaces that are configured to receive information in the various communication modes of the ECUs 30.

The intelligent cruise control unit 10 includes a distance detection sensor (not shown) for determining the distance between the vehicle and another vehicle or obstacle on or adjacent a road. In one embodiment, one distance detection sensor is positioned at a front side of the vehicle to detect the vehicle-to-vehicle distance with respect to another vehicle. Alternatively or additionally, another distance detection sensor may be placed at a rear side of the vehicle to detect another vehicle approaching from behind. The vehicle-to-vehicle distance with respect to the other vehicle may be detected by a radar sensor, an ultrasonic wave sensor, or any other suitable sensor.

Figure 2:
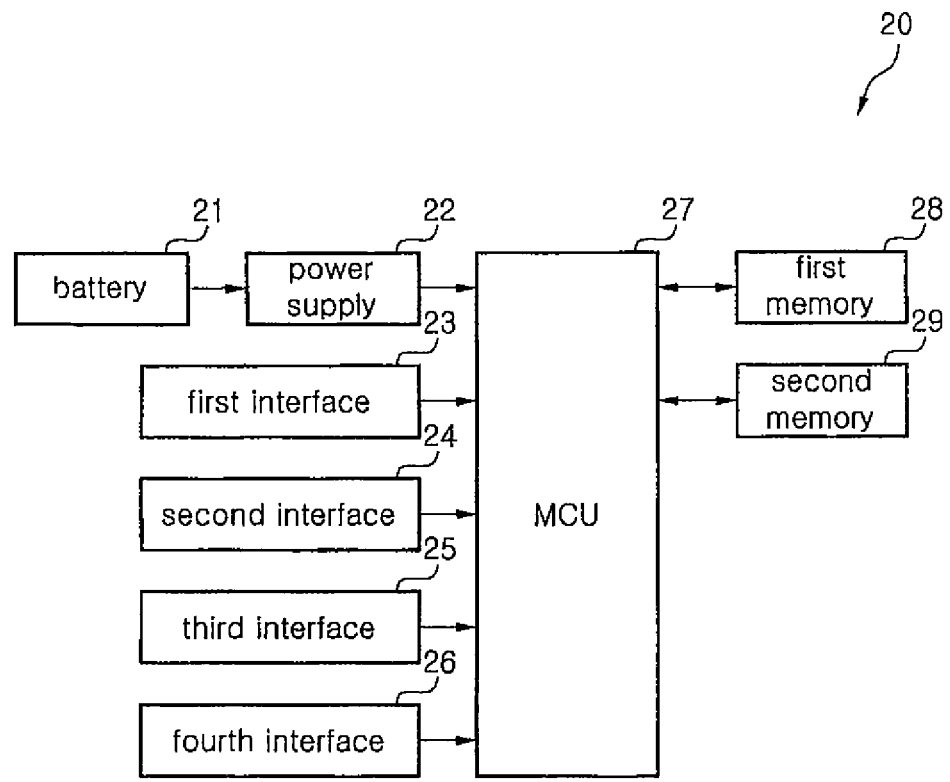
FIG. 2 is a block diagram of the gateway control apparatus shown in FIG. 1.

Referring to FIG. 2, which is block diagram of the gateway control apparatus shown in FIG. 1, the gateway control apparatus 20 includes first to fourth interfaces 23, 24, 25 and 26 for data communication between the ECUs 30 having different communication modes. Four interfaces are illustrated, but more may be included as needed to receive relevant information from the ECUs 30. The gateway control apparatus also includes a first memory 28 for storing the vehicle state information received through the first to fourth interfaces 23, 24, 25 and 26. The vehicle state information may include velocity, acceleration, distance from another vehicle or object, or road conditions.

The gateway control apparatus also includes a micro control unit (MCU) 27 for allowing the first memory 28 to store vehicle state information during a preset duration with reference to an accident occurrence time point. The micro control unit is described in more detail below with respect to FIG. 3. A second memory 29 is included to store pre-accident and post-accident vehicle state information by reading the pre-accident and post-accident vehicle state information from the first memory 28. The gateway control apparatus 20 further includes a power supply 22 which supplies power from a battery 11 to the MCU 27.

As described in more detail below, the accident occurrence time point is determined by a time point when a collision index exceeds a predetermined value. Here, the collision index is calculated by the MCU 27 using a relative velocity and a relative acceleration, which are calculated based on a velocity and an acceleration of the vehicle, among the vehicle state information received through the first to fourth interfaces 23, 24, 25 and 26, and using the vehicle-to-vehicle distance sent from the intelligent cruise control unit 10.

In one embodiment, the first to fourth interfaces 23, 24, 25 and 26 are a controller area network (CAN), a local interconnect network (LIN), a media oriented systems transport (MOST), and a FlexRay, respectively, although the disclosure is not limited thereto. Accordingly, each of the ECUs 30 having different communication modes sends the vehicle state information to the gateway control apparatus 20 through the first to fourth interfaces 23, 24, 25 and 26. For example, the MOST system may transmit information with optical fibers while the CAN system may transmit through conductive wires. The MCU 27 includes the plurality of interfaces to receive vehicle state information from the various ECUs 30. Other interfaces may be included for other systems or sensors in the vehicle, such as the intelligent cruise control unit 10. Additionally or alternatively, ECUs or other sensors with the same communication modes may send information through the same interface. For example, the intelligent cruise control unit 10 may send the vehicle-to-vehicle distance to the gateway control apparatus 20 through the same interface as the LIN.

The first memory 28 stores the vehicle state information sent from the ECUs through the first to fourth interfaces 23, 24, 25 and 26. The first memory 28 may store the vehicle state information received through the first to fourth interfaces 23, 24, 25 and 26 after encoding and compressing the information in a predetermined data compression manner. The first memory 28 is a low capacity volatile memory and may have a high access rate. One example of the first memory 28 is a Random Access Memory (RAM).

The second memory 29 stores the pre-accident and post-accident vehicle state information. Thus, when power is not supplied to the gateway control apparatus due to a vehicle accident, the information stored in the second memory 29 is not deleted, but may be used for analysis of accurate causes and factors contributing to the accident.

The second memory 29 may be a non-volatile memory having a low access rate and a high capacity. Alternatively, a non-volatile memory having a high access rate, for example, a Ferroelectric Random Access Memory (FRAM), may be used as the second memory 29. The second memory 29 may store the pre-accident and post-accident vehicle state information after encoding and compressing the vehicle state information. Alternatively, the second memory 29 may store the pre-accident and post-accident vehicle state information in the same format in which the first memory 28 stored the information.

Figure 3:
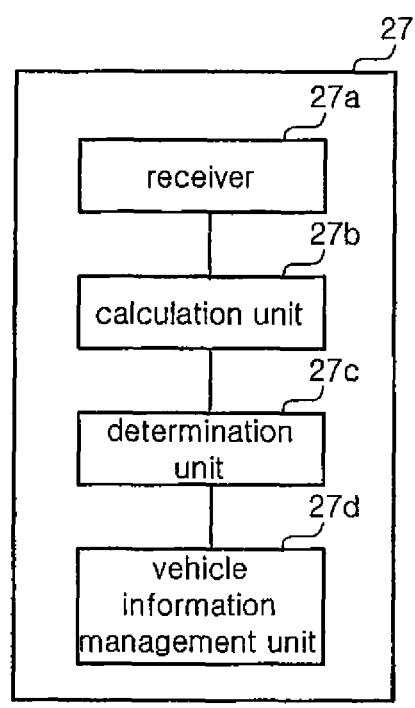
FIG. 3 is a block diagram of a micro control unit shown in FIG. 2.

The MCU 27 will hereinafter be described with reference to FIG. 3. The MCU 27 includes a receiver 27a, a calculation unit 27b, a determination unit 27c, and a vehicle information management unit 27d. The receiver 27a receives the vehicle state information sent from the ECUs 30 through the first to fourth interfaces 23, 24, 25 and 26. The MCU 27 is configured to store the vehicle state information which has been received by the receiver 27a in the first memory 28. When stored in the first memory 28, each piece of the vehicle state information is stored with a time stamp. Here, the time stamp may be calculated by a timer (not shown) embedded in the gateway control apparatus 20. Additionally, the receiver 27a receives the vehicle-to-vehicle or vehicle-to-object distance from the intelligent cruise control unit 10 through one of the first to fourth interfaces 23, 24, 25 and 26.

The calculation unit 27b calculates the relative velocity and the relative acceleration based on a velocity and an acceleration of the vehicle among the vehicle state information received through the first to fourth interfaces 23, 24, 25 and 26. Further, the calculation unit 27b calculates the collision index using the relative velocity, the relative acceleration, and the vehicle-to-vehicle or vehicle-to-object distance according to the following Equation 1. The collision index varies according to the relative velocity, the relative acceleration, and the vehicle-to-vehicle distance. For example, when the vehicle is in a major accident or in a fender bender or minor collision, the collision index is higher than a predetermined value. Further, when the vehicle is in a dangerous circumstance that may cause an accident, the collision index is also higher than the predetermined value. As a result, the gateway control apparatus can recognize if an accident has occurred or if the vehicle is in a dangerous circumstance that could lead to an accident according to how much higher the collision index is than the predetermined value.

$$Pc = Kp + Kd \quad\quad 1$$

In Equation 1, Pc indicates a collision index, Kp indicates a value obtained by dividing the relative velocity by the vehicle-to-vehicle distance, and Kd indicates a value obtained by dividing the relative acceleration by the vehicle-to-vehicle distance.

When the calculated collision index exceeds a predetermined value, that is, a minimum collision index for accident determination, the determination unit 27c determines an accident occurrence time point.

The vehicle information management unit 27d allows the first memory 28 to store vehicle state information before and after occurrence of a vehicle accident, that is, pre-accident and post-accident vehicle state information, as provided for a predetermined duration with reference to the accident occurrence time point determined by the determination unit 27c. In other words, the vehicle information management unit 27d allows the first memory 28 to store the vehicle state information several seconds after the accident occurrence time point. The vehicle information management unit 27d performs a time count, and receives the vehicle state information after occurrence of the vehicle accident until counted time reaches a preset time.

More specifically, in the first memory 28, vehicle state information received through the first to fourth interfaces 23, 24, 25 and 26 for a predetermined duration after occurrence of the accident, that is, the post-accident vehicle state information, is added to the vehicle state information stored in the first memory 28 upon occurrence of the accident, that is, the pre-accident vehicle state information. When the counted time reaches the preset time, the vehicle information management unit 27d allows the first memory 28 to store the received vehicle state information after occurrence of the vehicle accident, that is, the post-accident vehicle state information. Then, the vehicle information management unit 27d stops storing the post-accident vehicle state information in the first memory 28.

Further, the vehicle information management unit 27d is configured to store the pre-accident and post-accident vehicle state information in the second memory 29 read from the first memory 28. More specifically, after the predetermined period of time elapses and the vehicle information management unit 27d stops allowing the first memory 28 to store vehicle state information, the vehicle information management unit 27d reads the vehicle state information from the first memory 28 and stores it in the second memory 29. The vehicle information management unit 27d determines the amount of information to read from the first memory 28 with reference to the accident occurrence time point. More particularly, the pre-accident and post-accident vehicle state information is read from the first memory 28 and stored in the second memory 29. Therefore, when power is not supplied to the gateway control apparatus due to a vehicle accident including a fender bender or minor collision, the vehicle state information stored in the second memory 29 is accessible and can be used for analysis of accurate causes and factors contributing to the accident.

Figure 4:
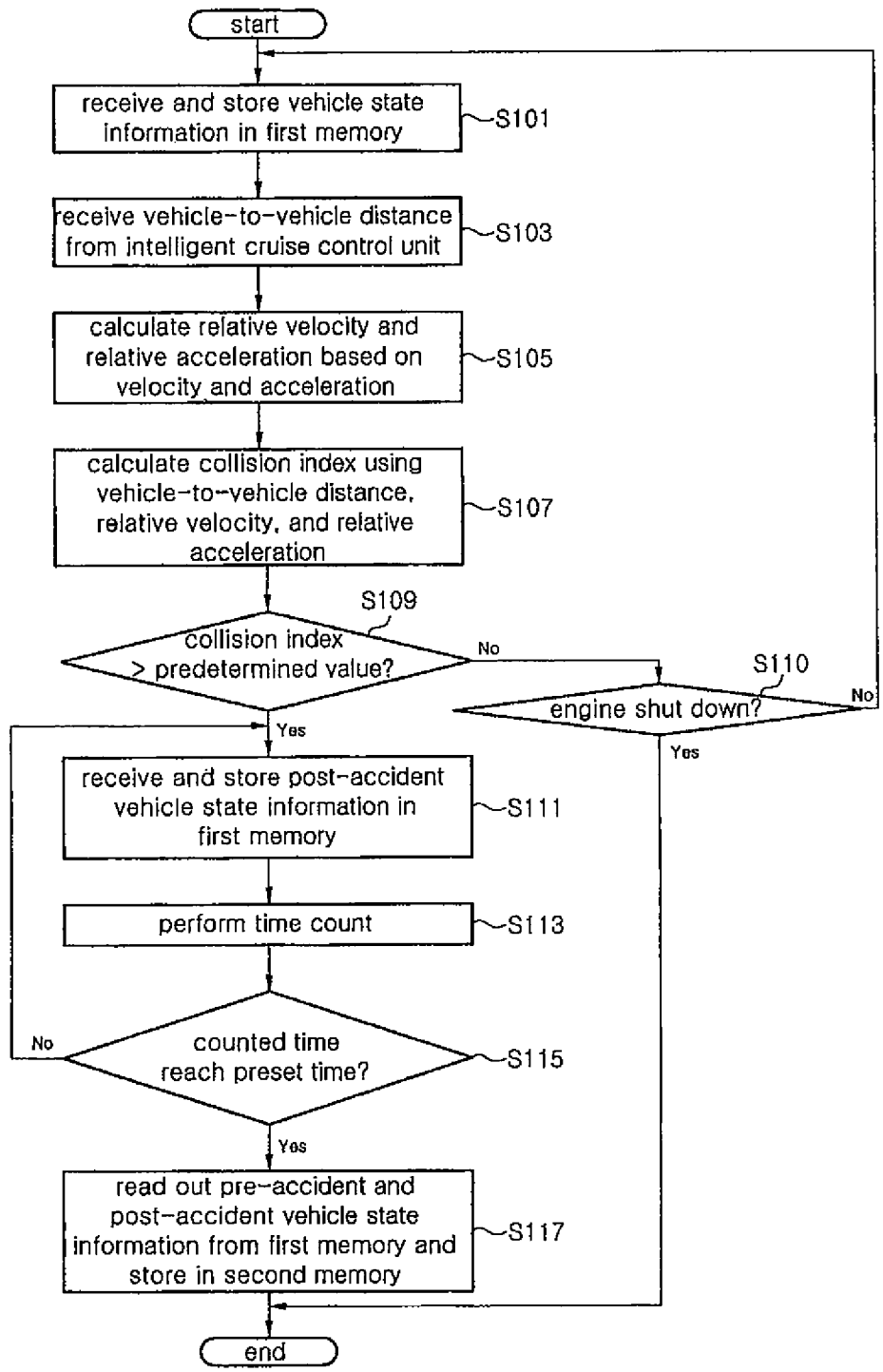
FIG. 4 is a flowchart of a travel information recording method of the gateway control apparatus according to one embodiment of the disclosure.

FIG. 4 is a flowchart of a travel information recording method of the gateway control apparatus according to one embodiment of the disclosure.

Referring to FIG. 4, the receiver 27a of the gateway control apparatus receives vehicle state information, such as vehicle velocity, acceleration, and the like, sent from the ECUs 30 through the first to fourth interfaces 23, 24, 25 and 26, and stores the received vehicle state information in the first memory 28, in S101.

Then, the receiver 27a receives a vehicle-to-vehicle or vehicle-to-object distance from the intelligent cruise control unit 10 through one of the interfaces 23, 24, 25 and 26 in S103. Although this embodiment is illustrated as performing the operation S103 after the operation S101, the disclosure is not limited thereto. That is, the method according to the disclosure may be realized in various manners so long as the vehicle state information and the vehicle-to-vehicle distance are received before performing operation S105 described hereinafter.

Next, the calculation unit 27b extracts the velocity and the acceleration of the vehicle from the received vehicle state information, and calculates a relative velocity and a relative acceleration based on the extracted velocity and acceleration in S105. Then, the calculation unit 27b calculates a collision index using the vehicle-to-vehicle distance, the relative velocity, and the relative acceleration according to Equation 1 in S107.

Next, the determination unit 27c determines whether the collision index exceeds a predetermined value in S109. If it is determined in S109 that the collision index does not exceed the predetermined value, the determination unit 27c determines whether an engine of the vehicle is shut down in S110. If it is determined in S110 that the engine of the vehicle is shut down, the vehicle information management unit 27d terminates the process. Conversely, if it is determined in S110 that the engine of the vehicle is not shut down, the vehicle information management unit 27d allows the process to proceed to the operation of receiving the vehicle state information in S101 to monitor a vehicle state.

If it is determined in S109 that the collision index exceeds the predetermined value, the vehicle information management unit 27d receives post-accident vehicle state information through the first to fourth interfaces 23, 24, 25 and 26, and allows the first memory 28 to store the received post-accident vehicle state information in S111. Here, pre-accident vehicle state information has already been stored in the first memory 28 in S101. The post-accident vehicle state information stored in the first memory 28 is the same kind as the pre-accident vehicle state information stored therein, but may have a different value from that of the pre-accident vehicle state information. For example, a traveling speed of 120 km/h is received as one piece of the pre-accident vehicle state information, but a traveling speed of 0 km/h is received as one piece of the post-accident vehicle state information.

Then, the vehicle information management unit 27d performs a time count in S113. The vehicle information management unit 27d determines whether counted time reaches a preset time in S115. If it is determined in S115 that the counted time does not reach the preset time, the vehicle information management unit 27d allows the process to proceed to the operation of receiving and storing the post-accident vehicle state information in the first memory 28 in S111.

If it is determined in S115 that the counted time reached the preset time, the vehicle information management unit 27d reads the pre-accident vehicle state information and the post-accident vehicle state information from the first memory 28, and allows the second memory 29 to store the pre-accident vehicle state information and the post-accident vehicle state information in the second memory 29.

As a result, the calculation of the collision index allows the gateway control apparatus to record vehicle state information not only in a major accident but also in a fender bender or minor collision. This enables accurate analysis of causes and factors contributing to the accident, which can then translate into preventing reoccurrence of the same kind of accident.

As apparent from the above description, according to one embodiment of the disclosure, the gateway control apparatus stores vehicle state information relating to a fender bender or minor collision, so that the stored information can be used for post-accident judgment of fault and responsibility for the accident.

Particularly, according to one embodiment of the disclosure, the gateway control apparatus enables analysis of user's vehicle driving habits based on the vehicle state information, which has been stored during the fender bender or collision, and can provide a safe driving guidance for prevention of accidents, for example, a safety distance, based on the vehicle state information.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gateway control apparatus for vehicles that enables data communication between electronic control units having different communication modes, the apparatus comprising:
   a receiver configured to receive vehicle state information from the electronic control units of a vehicle and a vehicle-to-vehicle distance from an intelligent cruise control unit, the vehicle state information including a vehicle velocity or a vehicle acceleration;
   a first memory configured to store the received vehicle state information;
   a calculation unit configured to calculate a relative velocity and a relative acceleration based on the received vehicle state information and configured to calculate a collision index using the relative velocity, the relative acceleration, and the vehicle-to-vehicle distance;
   a determination unit configured to determine whether the collision index exceeds a predetermined value; and
   a vehicle information management unit configured to determine an accident occurrence time point when it is determined that the collision index exceeds the predetermined value and configured to store pre-accident vehicle state information and post-accident vehicle state information obtained with reference to the accident occurrence time point in the first memory.

2. The gateway control apparatus according to claim 1, wherein the vehicle information management unit is configured to store the pre-accident vehicle state information and the post-accident vehicle state information from the first memory in a second non-volatile memory.

3. The gateway control apparatus according to claim 1, wherein the vehicle information management unit receives and stores the post-accident vehicle state information in the first memory with the pre-accident vehicle state information already stored in the first memory.

4. The gateway control apparatus according to claim 1, wherein:
   the collision index includes a first value and a second value, the first value being obtained by dividing the relative velocity by the vehicle-to-vehicle distance, the second value being obtained by dividing the relative acceleration by the vehicle-to-vehicle distance.

5. The gateway control apparatus of claim 1, wherein the vehicle information management unit is configured to initiate and monitor a time count when it is determined that the collision index exceeds the predetermined value.

6. The gateway control apparatus of claim 5, wherein the vehicle information management unit is configured to store the pre-accident vehicle state information and the post-accident vehicle state information in the first memory when the time count does not exceed a pre-selected time value.

7. The gateway control apparatus of claim 6, wherein the vehicle information unit is configured to read the pre-accident vehicle state information and the post-accident vehicle state information from the first memory and to store the vehicle state information in a second memory when the time count exceeds the pre-selected time value.

8. A travel information recording method of a gateway control apparatus for vehicles, comprising:
receiving vehicle state information from electronic control units of a vehicle, the vehicle state information including a vehicle velocity or a vehicle acceleration;
receiving a vehicle-to-vehicle distance measured by an intelligent cruise control unit;
storing the vehicle state information and the vehicle-to-vehicle distance in a first memory;
calculating a relative velocity and a relative acceleration based on the received vehicle state information;
calculating a collision index using the relative velocity, the relative acceleration, and the vehicle-to-vehicle distance;
determining whether the collision index exceeds a predetermined value;
determining an accident occurrence time point when it is determined that the collision index exceeds the predetermined value; and
storing, in the first memory, pre-accident vehicle state information and post-accident vehicle state information obtained with reference to the accident occurrence time point.

9. The method according to claim 8, further comprising:
reading the pre-accident vehicle state information and the post-accident vehicle state information from the first memory; and
storing the pre-accident vehicle state information and the post-accident vehicle state information in a second non-volatile memory.

10. The method according to claim 8, wherein the storing pre-accident vehicle state information and post-accident vehicle state information in the first memory comprises:
initiating a time count when the collision index exceeds a predetermined value;
determining whether the time count exceeds a preset time;
receiving the post-accident vehicle state information, when it is determined that the time count does not exceed the preset time; and
storing the post-accident vehicle state information with the pre-accident vehicle state information in the first memory, when the time count reaches the preset time.

11. A gateway control apparatus for a vehicle, comprising:
a receiver configured to receive vehicle state information from electronic control units of a vehicle, the vehicle state information including a vehicle-to-object distance, a vehicle velocity, and a vehicle acceleration;
a first memory configured to store the received vehicle state information;
a calculation unit configured to calculate a relative velocity and a relative acceleration based on the received vehicle state information and configured to calculate a collision index using the relative velocity, the relative acceleration, and the vehicle-to-object distance;
a determination unit configured to determine whether the collision index exceeds a predetermined value;
a vehicle information management unit configured to determine an accident occurrence time point when it is determined that the collision index exceeds the predetermined value and configured to store pre-accident vehicle state information and post-accident vehicle state information obtained with reference to the accident occurrence time point in the first memory.

12. The gateway control apparatus of claim 11, wherein the vehicle-to-object distance is a distance from the vehicle to another vehicle.

13. The gateway control apparatus of claim 11, wherein the vehicle is traveling on a road and the vehicle-to-object distance is a distance from the vehicle to an obstacle on or adjacent the road.

14. The gateway control apparatus of claim 11, wherein the vehicle information management unit is further configured to perform a time count that starts at the accident occurrence time point and stops after expiration of a preselected time.

15. The gateway control apparatus of claim 14, wherein the vehicle information management unit stores the post-accident vehicle state information in the first memory until the time count stops.

16. The gateway control apparatus of claim 15, wherein the vehicle information management unit is further configured to store the pre-accident vehicle state information and the post-accident vehicle state information in a second memory after the time count stops.

* * * * *